F. J. LICHTY.
CORN HARVESTING AND HUSKING MACHINE.
APPLICATION FILED JUNE 18, 1909.

966,029.

Patented Aug. 2, 1910.
4 SHEETS—SHEET 1.

Witnesses
Jos Gregory.

Inventor
Frank J. Lichty
By
Attorneys

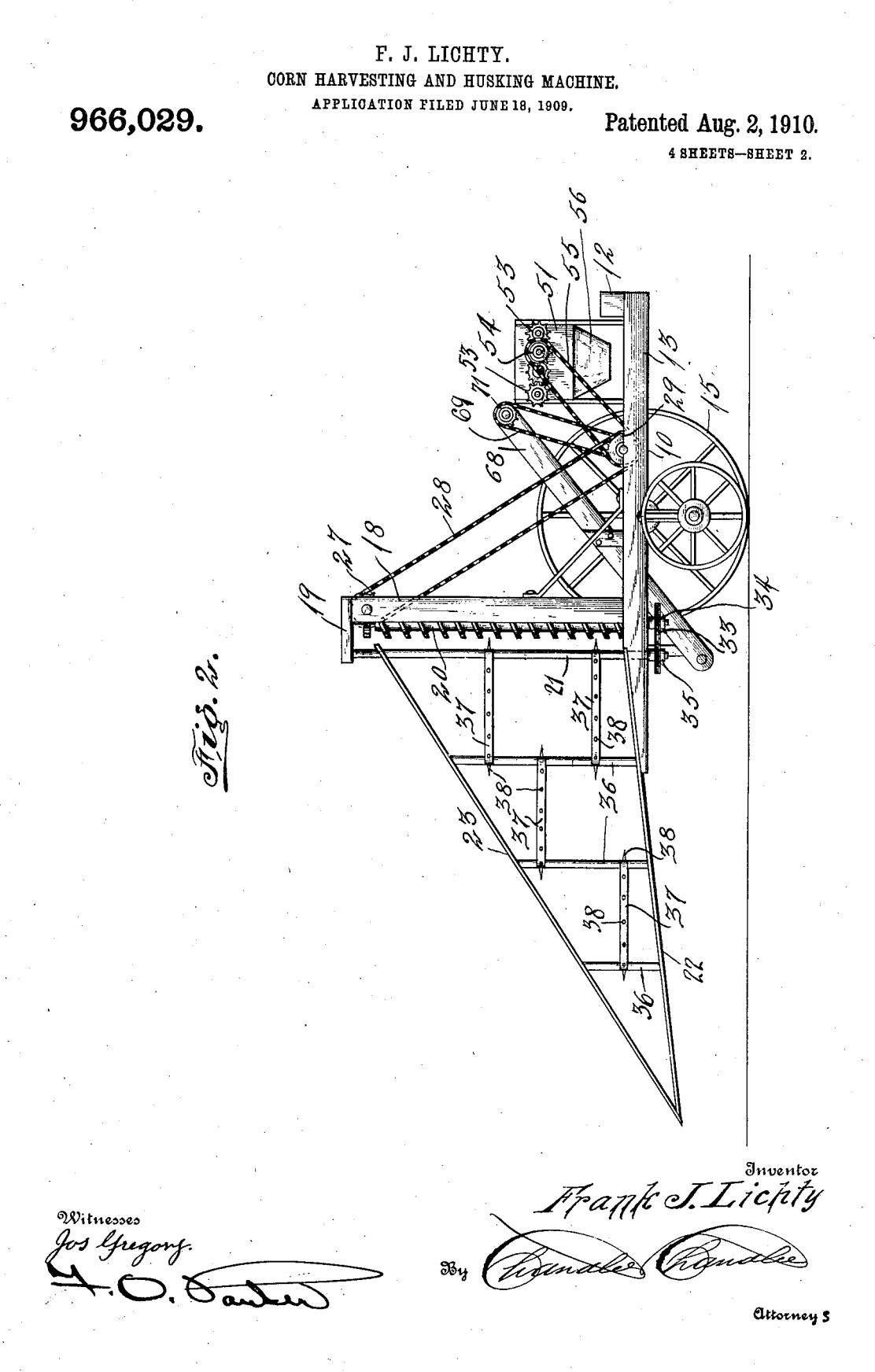

F. J. LICHTY.
CORN HARVESTING AND HUSKING MACHINE.
APPLICATION FILED JUNE 18, 1909.

966,029.

Patented Aug. 2, 1910.
4 SHEETS—SHEET 2.

Fig. 2.

Witnesses
Jos Gregory
F. O. Parker

Inventor
Frank J. Lichty
By Chandlee & Chandlee
Attorneys

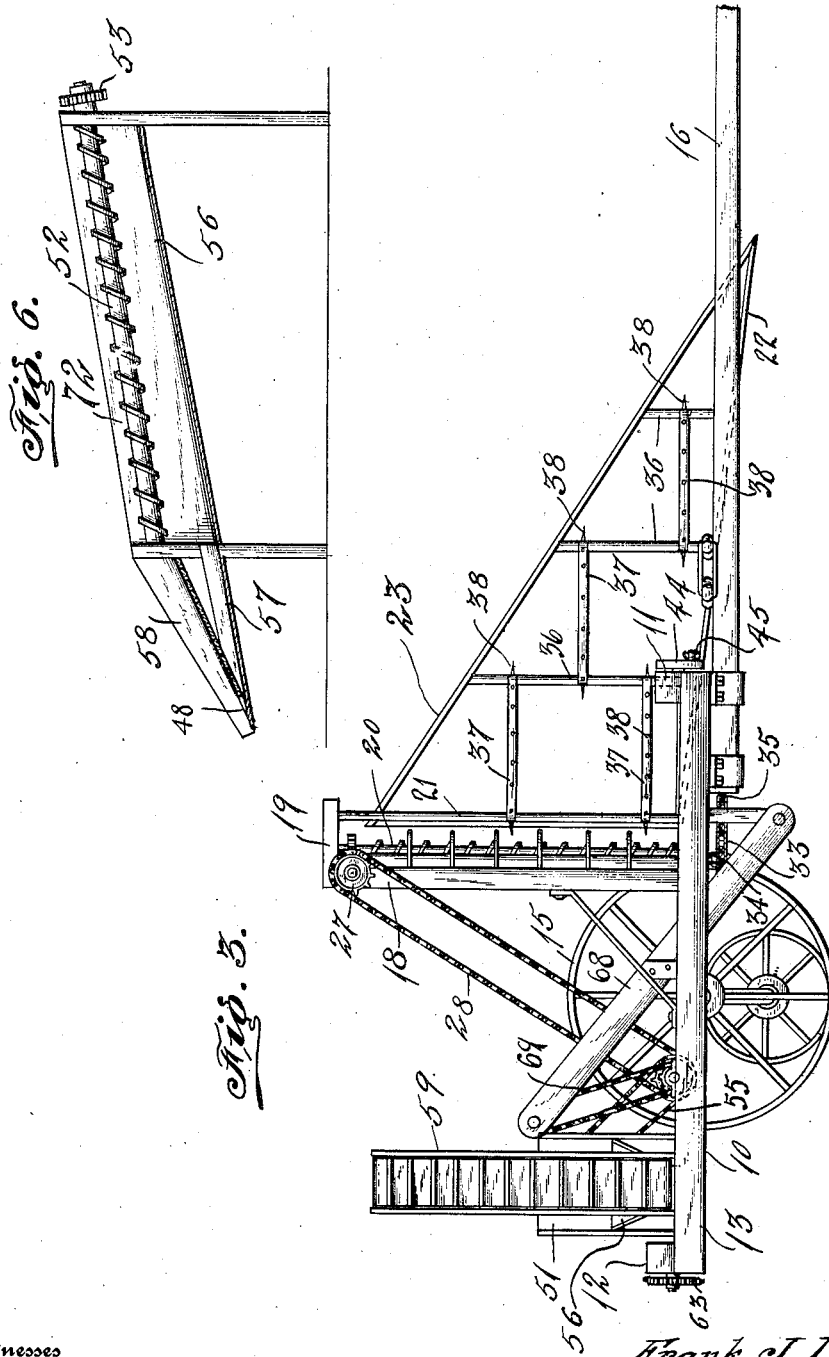

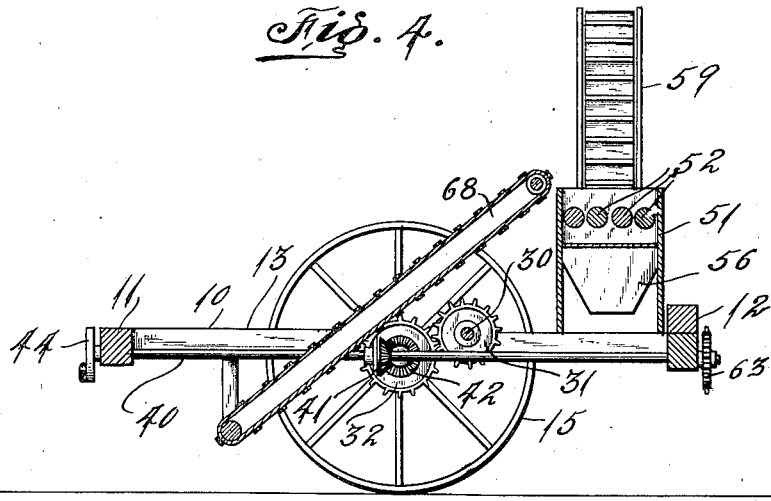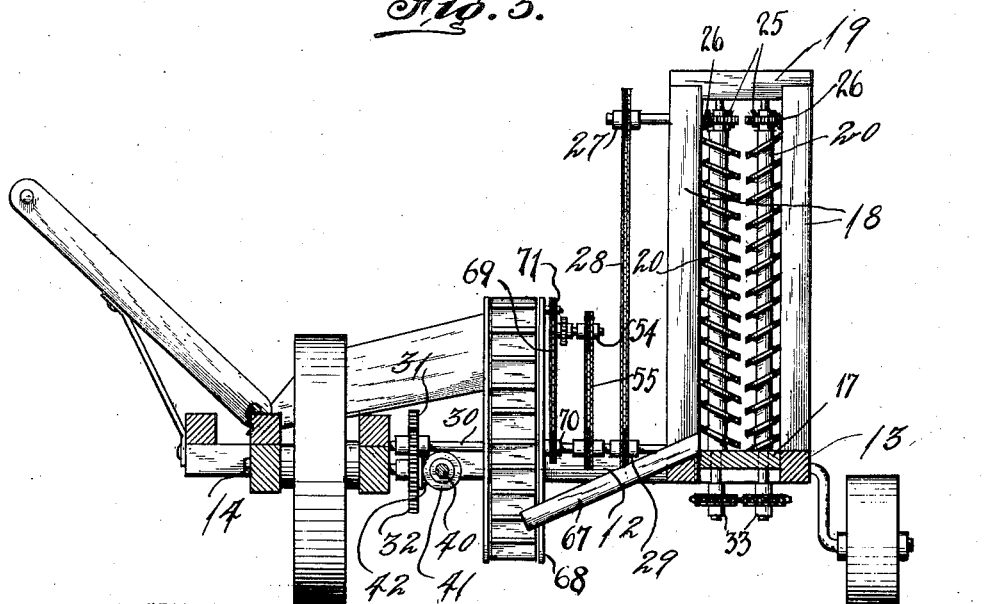

UNITED STATES PATENT OFFICE.

FRANK J. LICHTY, OF ROCKFORD, OHIO.

CORN HARVESTING AND HUSKING MACHINE.

966,029.

Specification of Letters Patent. Patented Aug. 2, 1910.

Application filed June 18, 1909. Serial No. 502,956.

*To all whom it may concern:*

Be it known that I, FRANK J. LICHTY, a citizen of the United States, residing at Rockford, in the county of Mercer, State of Ohio, have invented certain new and useful Improvements in Corn Harvesting and Husking Machines; and I do hereby declare the following to be a full, clear, and exact description of the invention, such as will enable others skilled in the art to which it appertains to make and use the same.

The invention relates to a corn harvesting and husking machine and more particularly to the class of machines adapted to be drawn through a field for severing growing corn stalks and subsequently snapping the ears from the stalks and cutting and removing the husks from the ears.

The primary object of the invention is the provision of a machine of this character in which corn stalks will be cut or severed as the machine is advanced or drawn through a corn field and which stalks are acted upon to remove their ears, the latter being conveyed to husking rollers so as to separate or remove the husks from the ears and subsequently delivered from the machine.

Another object of the invention is the provision of a machine of this character in which simple and efficient mechanism is provided for severing corn stalks while standing in a field, removing the ears therefrom and separating the husks from the ears.

A further object of the invention is the provision of a machine of this character which is simple in construction, thoroughly reliable and efficient in operation and inexpensive in the manufacture.

In the drawings accompanying and forming part of this specification is illustrated the preferred form of embodiment of the invention which to enable those skilled in the art to practice the invention, will be set forth at length in the following description, while the novelty of the invention will be pointed out in the claims succeeding the description. However, it is to be understood that changes, variations and modifications may be made, such as come properly within the scope of the appended claims, without departing from the spirit of the invention.

In the drawings:—Figure 1 is a top plan view of a machine constructed in accordance with the invention. Fig. 2 is an end elevation thereof. Fig. 3 is an elevation looking toward the opposite end of the machine. Fig. 4 is a transverse sectional view on the line 4—4 of Fig. 1. Fig. 5 is a longitudinal sectional view on the line 5—5 of Fig. 1. Fig. 6 is a sectional view on the line 6—6 of Fig. 1.

Similar reference characters indicate corresponding parts throughout the several views in the drawings.

Referring to the drawings by numerals 10 designates generally the main frame of the machine which may be of any suitable character and material, although in this instance it consists of front beam 11, rear beam 12 and end beams 13 the same being united in any preferable manner to form a substantially rectangular shaped unitary frame structure. Near the right hand end of the frame and fixed to the front and rear beams 11 and 12 are spaced transverse bars carrying bearings in which is mounted a rotatable axle 14 having fixed thereto a main driving or traction wheel 15 which latter is of the usual type.

Projecting forwardly from the front beam 11 of the main frame is a draft tongue 16 supporting the usual double tree with which are connected in the ordinary manner draft animals whereby the machine may be drawn through a field. In the forward left hand corner of the main frame 10 is a platform 17 the same having rising therefrom spaced vertically arranged posts or standards 18, the upper ends of which are united by a cross head or bridge piece 19 in which and the platform 17 are journaled the extremities of a pair of closely arranged vertical snapping rollers 20 the latter being of the ordinary construction. Slightly in advance of these snapping rollers 20 are arranged vertical feed rollers 21 the latter being journaled in the said cross head 19 and the platform 17 whereby they may be rotated with the snapping rollers in a manner as will be hereinafter more fully described.

Projecting forwardly from the front of the frame 10 are spaced gathering arms, each comprising a frame composed of forwardly and downwardly inclined bars 22 and 23 so that the same converge and are united at their outer ends, the inner ends of said bars being connected to the main frame 10 and the feed roller respectively. The free ends of the gathering arms are outwardly flared to direct growing corn stalks between them during the forward travel of the machine.

Mounted in the upper ends of the posts 18 is a horizontal shaft 24 the same provided with oppositely directed worm threads 25 meshing with worm gears 26 fixed to the upper ends of the snapping rollers 20 whereby the latter may be rotated in opposite directions. Fixed to the shaft 24 is a sprocket wheel 27 over which is trained a sprocket chain 28 the latter being also trained over a sprocket wheel 29 fixed to a driven shaft 30 the latter also having fixed thereto a gear 31 meshing with a gear 32 fixed to the axle 14 carrying the traction wheel and in this manner motion is imparted from the traction wheel to the snapping rollers to effect the operation thereof upon the advancement of the machine. This driven shaft 30 is suitably mounted in the main frame 10 of the machine.

Fixed to the lower ends of the snapping rollers 20 are sprocket wheels 33 over which are trained sprocket chains 34 the latter being also trained over sprocket wheels 35 fixed to the lower ends of the feed rollers 21 so as to cause the latter to rotate in the same direction as the snapping rollers.

Journaled in the beams 22 and 23 of the frames of the gathering arms are vertical rollers 36 which latter are spaced from each other and have trained thereover horizontally arranged straps or belts 37 each being arranged in a different plane from the other and these belts are provided with gathering fingers or prongs 38 which are adapted to engage standing stalks and to gather the same rearwardly in the direction of the snapping rollers.

Journaled in the front and rear beams 11 and 12 longitudinally of the main frame 10 is a shaft 40 which latter has fixed thereto a beveled pinion 41 meshing with a beveled gear 42 on the inner end of the axle 14 and this shaft 40 projects a suitable distance beyond the front and rear beams 11 and 12 and on its forward end is fixed a disk wheel 44 to which is eccentrically connected a pitman 45 the latter being pivotally connected to an oscillating cutter blade 46 pivoted to the front beam 11 between the gathering arms and adjacent this cutter blade 46 is a stationary blade 47. These blades 46 and 47 coöperate with each other to sever the standing corn stalks as the machine is advanced through a corn field.

Rising from the main frame 10 is a laterally inclined husking frame 51 the inclination of which is toward one end of the main frame and journaled therein are a series of closely arranged parallel husking rollers 52 the journals of which have fixed thereto gears 53 adapted to mesh with each other and thereby rotate the husking rollers in opposite directions with respect to each other. On the journal end of one husking roller is also fixed a sprocket wheel 54 over which is trained a sprocket chain 55 the latter also trained over a sprocket fixed to the driven shaft 30 so as to permit the rotation of the husking rollers.

Immediately below the husking rollers 52 and mounted within the frame 51 is a corn board or tray 56 which latter is adapted to catch scattered corn as the husking operation is continued and to deposit the same in a trough 57 having communication with the corn board or tray the same communicating as at 48 with a discharge chute 58 mounted at the delivery end of the husking frame. The chute 58 leads to a conveyer 59 of any suitable character and is designed to convey the ears of corn to a wagon or any other suitable point from the husking frame of the machine. The conveyer 59 is actuated through a shaft 60 the latter rotated by a sprocket chain 61 trained over a sprocket 62 on said shaft and also over a sprocket 63 fixed to the end of the driven shaft 40 of the machine.

Secured to the main frame of the machine is a downwardly inclined trough 67 the latter in communication with the lower end of an elevator 68 leading to the frame 51 so as to convey the ears of corn from the snapping rollers to the husking rollers. The elevator 68 is driven through the medium of a sprocket chain 69 trained over a sprocket wheel 70 carried by the driven shaft and also over a sprocket wheel 71 fixed to the journal end at one extremity of the elevator.

Transversely disposed on the frame 51 at opposite sides of the husking rollers 52 are side plates 72 which latter serve to prevent the ears of corn from escaping during the husking operation. It is obvious that the bands 37 are arranged in varying planes with respect to each other so as to have the prongs 38 thereof grab the standing corn stalks of different lengths and also any stalks that may have been tramped or broken down in the field.

Upon the main frame 10 of the machine is mounted a driver's seat 73 of the usual construction.

What is claimed is:—

1. In a machine of the class described, a main frame, gathering arms projecting forwardly from the main frame, each arm comprising forwardly converging beams, spaced vertical rollers journaled in the said beams of each gathering arm, a plurality of endless bands trained over the rollers, the bands being disposed in different horizontal planes, fingers projecting from the said endless bands, vertical feed rollers at the innermost ends of the gathering arms and adapted to impart movement to the endless bands, snapping rollers arranged in rear of the feed rollers, gears fixed to the snapping rollers, a worm threaded shaft acting upon the said gears to rotate the successive rollers in the same direction, husking mechanism supported upon the main frame rearwardly of the snapping rollers and elevator mechanism having connection with the husking mechanism.

2. In a machine of the class described, a main frame, gathering arms projecting forwardly from the main frame, each arm comprising forwardly converging beams, spaced vertical rollers journaled in the said beams of each gathering arm, a plurality of endless bands trained over the rollers, the bands being disposed in different horizontal planes, fingers projecting from the said endless bands, vertical feed rollers at the innermost ends of the gathering arms and adapted to impart movement to the endless bands, snapping rollers arranged in rear of the feed rollers, gears fixed to the snapping rollers, a worm threaded shaft acting upon the said gears to rotate the successive rollers in the same direction, husking mechanism supported upon the main frame rearwardly of the snapping rollers and elevator mechanism having connection with the husking mechanism, a stationary cutter arranged between the gathering arms, a pivotal cutter mounted between the gathering arms and movable toward and away from the stationary cutter, a traction wheel journaled in the main frame and driven connections between the traction wheel and the husking mechanism, the worm threaded shaft and the movable cutting blade.

3. In a machine of the class described, a main frame, gathering arms projecting forwardly from the main frame, each arm comprising forwardly converging beams, spaced vertical rollers journaled in the said beams of each gathering arm, a plurality of endless bands trained over the rollers, the bands being disposed in different horizontal planes, fingers projecting from the said endless bands, vertical feed rollers at the innermost ends of the gathering arms and adapted to impart movement to the endless bands, snapping rollers arranged in rear of the feed rollers, gears fixed to the snapping rollers, a worm threaded shaft acting upon the said gears to rotate the successive rollers in the same direction, husking mechanism supported upon the main frame rearwardly of the snapping rollers, elevator mechanism having connection with the husking mechanism, a stationary cutter arranged between the gathering arms, a pivotal cutter mounted upon the gathering arms and movable toward and away from the stationary cutter, a traction wheel journaled in the main frame, driven connections between the traction wheel and the husking mechanism, the worm threaded shaft and the movable cutting blade, and a discharge elevator having connection with the husking mechanism.

4. In a machine of the class described, a main frame, gathering arms projecting forwardly from the main frame, each arm comprising forwardly converging beams, spaced vertical rollers journaled in the said beams of each gathering arm, a plurality of endless bands trained over the rollers, the bands being disposed in different horizontal planes, fingers projecting from the said endless bands, vertical feed rollers at the innermost ends of the gathering arms and adapted to impart movement to the endless bands, snapping rollers arranged in rear of the feed rollers, gears fixed to the snapping rollers, a worm threaded shaft acting upon the said gears to rotate the successive rollers in the same direction, husking mechanism supported upon the main frame in rear of the snapping rollers, elevator mechanism having connection with the husking mechanism, a stationary cutter arranged between the gathering arms, a pivotal cutter mounted upon the gathering arms and movable toward and away from the stationary cutter, a traction wheel journaled in the main frame, driven connections between the traction wheel and the husking mechanism, the worm threaded shaft and the movable cutting blade, and a discharge elevator having connection with the husking mechanism.

In testimony whereof, I affix my signature, in presence of two witnesses.

FRANK J. LICHTY.

Witnesses:
E. E. JACKSON,
B. H. LICHTY.